United States Patent [19]

Wells

[11] Patent Number: 4,941,602
[45] Date of Patent: Jul. 17, 1990

[54] AIR DRYING AIR CHILLING CONTAINER ATTACHABLE TO A CAR WINDOW

[76] Inventor: Todd A. Wells, P.O. Box 8382, Richmond, Va. 23226

[21] Appl. No.: 402,386

[22] Filed: Jul. 18, 1989

Related U.S. Application Data

[63] Continuation-in-part of Ser. No. 124,581, Dec. 29, 1987, abandoned.

[51] Int. Cl.⁵ .................................................. B60R 9/00
[52] U.S. Cl. ...................... 224/42.45 R; 224/42.46 R; 224/42.42; 224/273; 34/151; 211/88
[58] Field of Search ............... 224/42.45 R, 42.45 A, 224/42.46 R, 42.46 A, 42.39, 42.4, 42.42, 273; 34/42, 151; 211/88; 108/42, 47; 248/223.4; 70/63; 220/334

[56] References Cited

U.S. PATENT DOCUMENTS

| | | | |
|---|---|---|---|
| 1,497,740 | 6/1924 | Schenkein | 215/288 |
| 1,566,982 | 12/1925 | Shee | 248/214 |
| 1,609,466 | 12/1926 | Dempsey | 224/42.46 R |
| 1,726,316 | 7/1928 | Saxton | 224/42.45 A |
| 1,817,056 | 8/1931 | Belgard | 108/47 |
| 2,344,339 | 3/1944 | Zwald | 224/42.45 A |
| 2,721,718 | 10/1955 | Wagner | 248/214 |
| 3,955,732 | 5/1976 | Böschen | 224/328 |
| 4,429,928 | 2/1984 | Sullivan | 34/151 |

Primary Examiner—Henry J. Recla
Assistant Examiner—Edward C. Donovan

[57] ABSTRACT

An air drying, air chilling container attachable to the outside of a car window or the like and providing an area within which various articles of apparel or other wet materials may be placed for drying or canned and bottled beverages may be placed for chilling. Air passes through portions of the container walls as the car travels from place to place and thusly warmer air drys or colder air chills the contents within. The container is readily attachable by means of a mounting bracket.

5 Claims, 5 Drawing Sheets

4,941,602

AIR DRYING AIR CHILLING CONTAINER ATTACHABLE TO A CAR WINDOW

BACKGROUND OF THE INVENTION

This application is a continuation-in-part of U.S. Ser. No. 7/124,581, now abandoned, filed 12/29/87.

The present invention concerns a container locational on the outside of an automobile window glass and within which container various articles may be dried or chilled.

Cars when traveling from place to place move through air of varying temperatures depending on climate and time of season.

A problem encountered by some people while traveling in cars from place to place is the absence of any appliance for drying small articles such as athletic shoes, head and wrist bands, bathing suits etc. Another problem encountered by some people while traveling in cars from place to place is the absence of any appliance for chilling canned and bottled beverages without the use of bulky containers and ice.

SUMMARY OF THE INVENTION

The present invention provides a ventilating container which holds articles to be dried or canned and bottled beverages to be chilled by the passage of air therethrough.

The present container is adapted for the attachment to the outside of an automotive vehicle window. A container is thereby provided within which an array of articles may be placed for drying or chilling. A mounting bracket attaches the container to and extends it outwardly from the exterior of a car window into the air flowing by as said car travels from place to place. This air-flow, which will be of various temperatures depending on climate and time of season, passes through ventilating portions of the container walls, thusly warmer air will dry various articles within, colder air will chill canned and or bottled beverages within. Access to the container interior may be a hinged lid or door(s) in the container.

Important objectives of the present invention include the provision of an air drying air chilling container for the temporary attachment to the outside of a car window whereby air may pass through the air drying air chilling container for drying and chilling purposes; the provision of an air drying air chilling container of low cost readily attachable to the outside of a car window without modification or change to said car window; the provision of an air drying air chilling container which utilizes air passing around said car as it travels from place to place. These and other objectives will become apparent in the following description of the invention.

DETAILED DESCRIPTION OF THE PREFERRED EMBODIMENT

Figure 2:
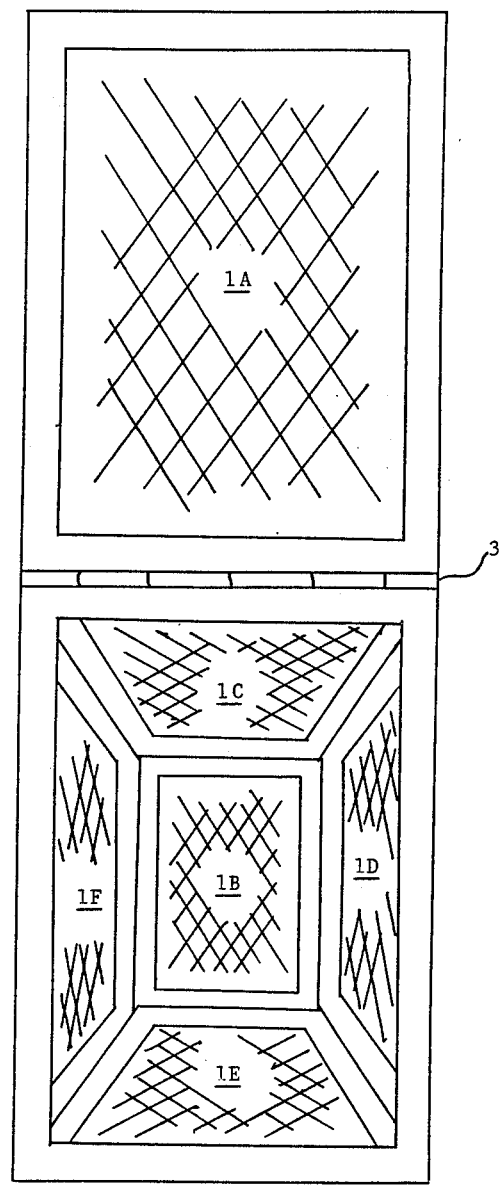
FIG. 2 is a view of the present structure downwardly directly into the container with its lid fully open.
Figure 4:
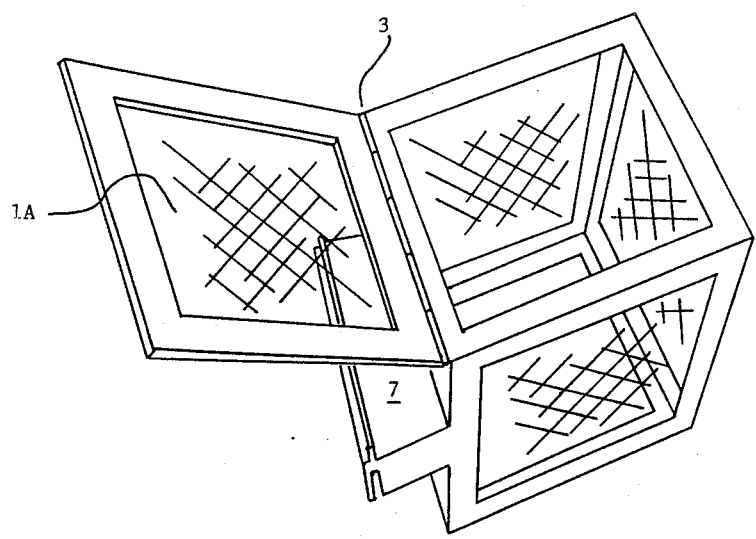
FIG. 4 is a rotated and reduced perspective view showing the present structure as seen from above, an angle such that more of a mounting bracket is exposed.

An enclosure FIG. 2 is six sided with an outwardly pivotal wall 1A as its top side. A mounting bracket 7 FIG. 4 is integral to the external side of enclosure wall 1C and may be longitudinal the width thereof. Mounting bracket 7 is blocklike in shape. The block-like shape serves to provide a surface area sufficient to generate strong support for the enclosure. Mounting bracket 7 also acts as an extension arm to hold the enclosure outward from the exterior of a car window frame. The bracket may be hollowed to some extent for the purpose of saving structural material. The preferred material of the enclosure and bracket is a moulded, lightweight, rigid plastic of high tensile strength that is resistant to temperature extremes. However, other substances such as metal, sheet metal, metal alloys, rubber and wood may be applied when practical.

Figure 3:
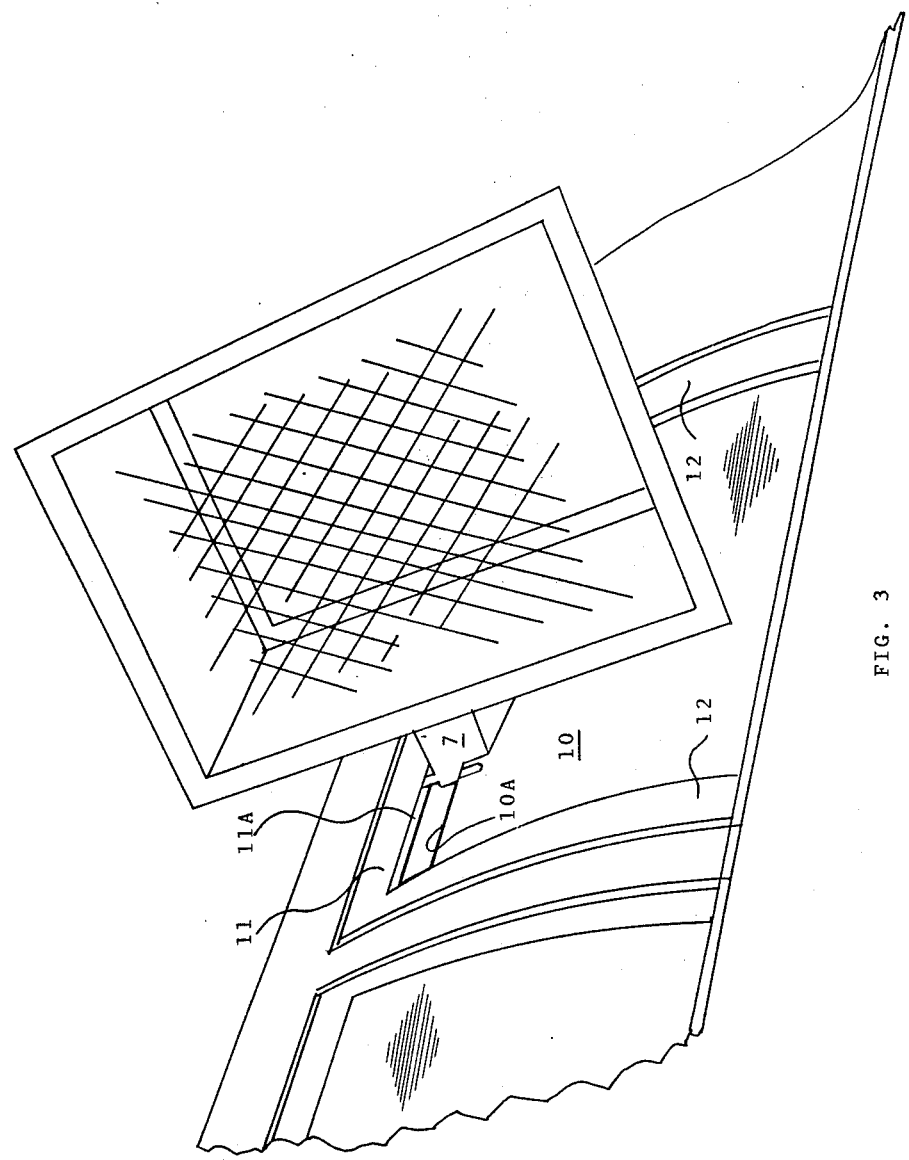
FIG. 3 shows the present structure mounted on the exterior of a car window as viewed eye-level with the bottom edge of the car window.
Figure 5:
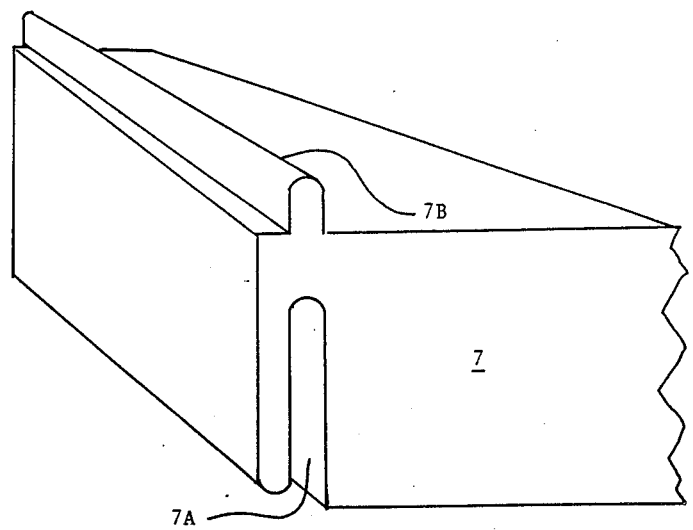
FIG. 5 is a fragmentary, enlarged view of a mounting bracket which may be used to support the air drying air chilling container.
Figure 6:
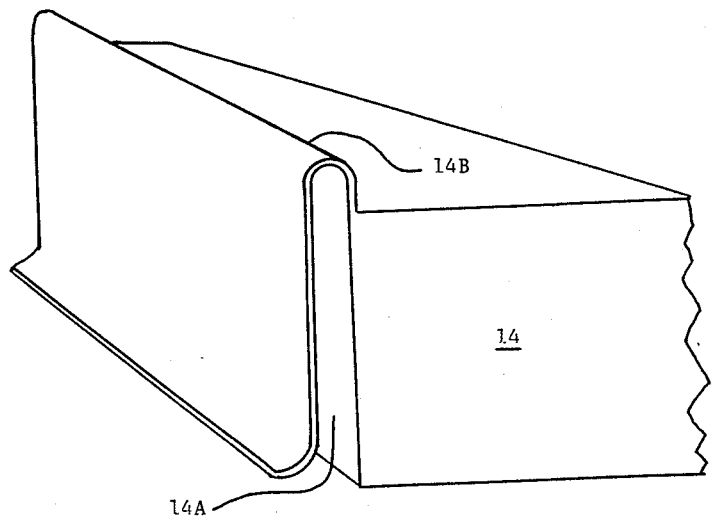
FIG. 6 is a fragmentary, enlarged view of a mounting bracket which may be used to support the air drying air chilling container.

The present structure is intended for temporary attachment to the outside of a car window. A vertically slidable car window glass pane 10 generally moves in a track or groove locational in the facing edges of two vertical sides 12 of the window frame as per FIG. 3. The top side of the window frame 11 contains a groove 11A into which the exposed edge of the window glass 10A fits when moved upwardly the full length of its travel. Mounting bracket 7 provides a longitudinal slot 7A which is slipped over the exposed edge 10A of a car window glass 10. The glass is then moved upward to the extent that the bracket shoulder 7B (shown enlarged in FIG. 5) engages and is pressed into groove 11A FIG. 3. The Air Drying Air Chilling Container is thusly considered to be "locked" in place. Mounting bracket 14 FIG. 6 is a variation of bracket 7. Bracket 14 is attachable in the same manner but it features a deeper slot 14A and a revised shoulder 14B which allows the upper edge of the window 10A FIG. 3 to travel farther upward to slot 11A. Suction cups may be added to the exterior of wall 1C below the bracket to provide for adhesion to the window glass and additional support of the enclosure.

Figure 1:
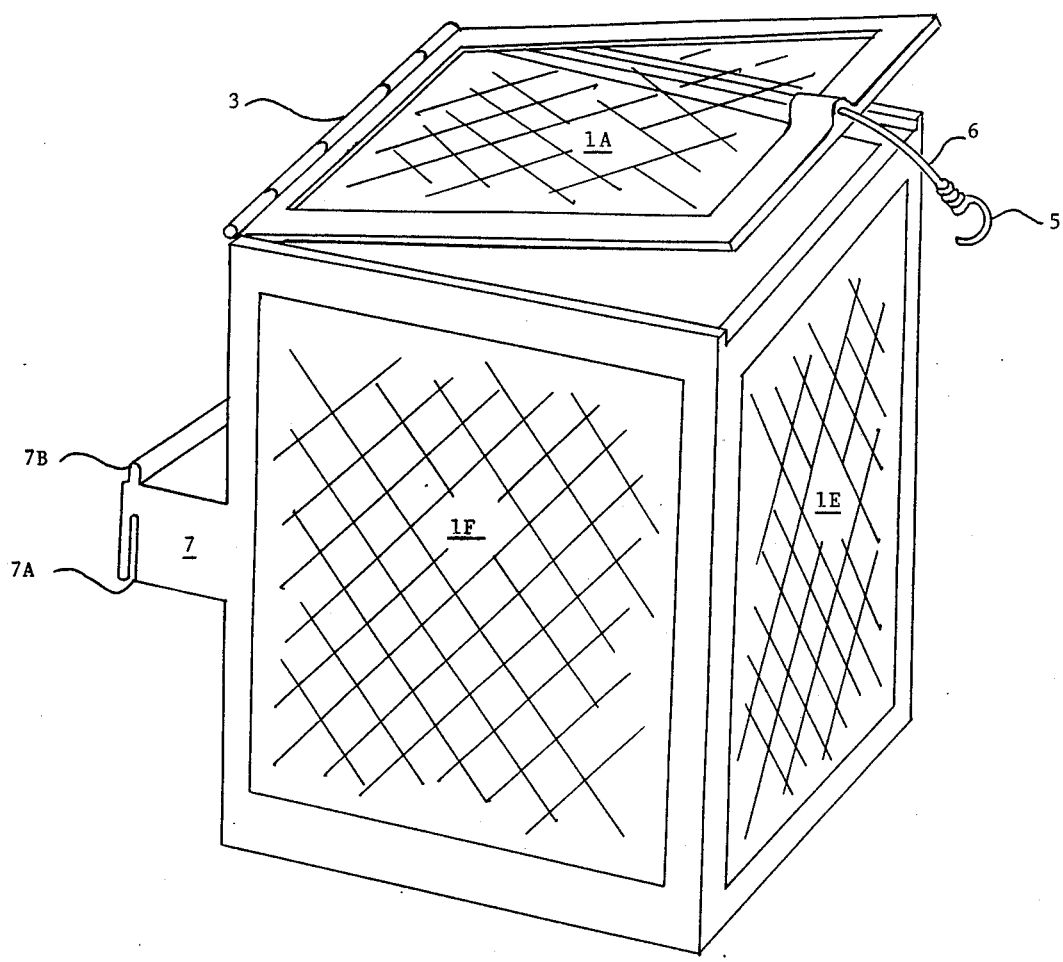
FIG. 1 is a perspective view of an article drying, canned or bottled beverage chilling container with its interior access lid slightly open.

Top wall 1A pivots outwardly on hinge 3 so as to provide an opening to access the enclosure interior as per FIG. 4. This lid or door may be locational as a vertical wall. Items to be dried or chilled are placed into the enclosure and rest on the bottom wall 1B FIG. 2. Articles to be dried may also be draped over cords or wire which may be strung across the interior of the enclosure. The lid may be held closed by means of a flexible cord 6 FIG. 1 which is attached to the edge of wall 1A opposite the hinge 3. A hook 5 is attached to the other end of the flexible cord. The cord is stretched downward and the hook is inserted into an opening in wall 1E.

When a car to which the Air Drying Air Chilling Container is attached travels from place to place, air flows into and of the enclosure through grid, louvered, screen, or perforated type panels that are formed as integral and ventilating portions of walls 1A, 1B, 1D, 1E, and 1F. This air flow contacts items that have been placed within the enclosure and thusly warmer air will dry or colder air will chill the items. Depicted walls 1A, 1B, 1D, 1E and 1F represent the grid type. Wall 1C may feature some ventilating portion or may be solid to provide greater support for the mounting bracket.

While I have shown only a few embodiments of the invention it will be apparent to those skilled in the art that the invention may be embodied still otherwise without departing from the spirit and scope of the invention.

I claim:

1. Apparatus for holding articles outside of an automotive vehicle while exposing them to the air stream resulting from movement of the vehicle, comprising a container having walls completely enclosing an interior chamber adapted to hold articles such as shoes and canned beverages, access means for accessing said chamber, and means for removably attaching the container to a window of a vehicle so that the container is held in a fixed position outside of the vehicle, said container walls having openings therethrough adapted to permit movement of air through the interior of the container while it is in said fixed position during travel of the vehicle to which the container is so attached.

2. Apparatus according to claim 1, in which said attaching means comprises an arm rigidly connected to and extending from the container, and at the end of said arm, means for engaging a vehicles window.

3. Apparatus according to claim 2, in which the engaging means at the end of said arm comprises a member having a downwardly facing slot adapted to fit over the top of a partially open window of a vehicle, and having an upwardly projecting shoulder adapted to fit into the slot or moulding in the window frame which receives the top of said window when it is closed.

4. Apparatus according to claim 1, in which the container comprises a rigid frame, a hinged door, and means for securing the door to the container.

5. Apparatus for holding articles outside of an automotive vehicle while exposing them to the air stream resulting from movement of the vehicle, comprising a container having walls completely enclosing an interior chamber adapted to hold articles such as shoes and canned beverages, access means for accessing said chamber, and means for removably attaching the container to a window of a vehicle so that the container is held in a fixed position outside of the vehicle, said container having side walls with openings therethrough adapted to permit substantially horizontal movement of air through the interior of the container while it is in said fixed position during travel of the vehicle to which the container is so attached.

* * * * *